United States Patent [19]

Lloyd

[11] Patent Number: 4,551,395

[45] Date of Patent: Nov. 5, 1985

[54] BEARING MATERIALS

[75] Inventor: Kenneth Lloyd, Grosse Pointe Park, Mich.

[73] Assignee: D.A.B. Industries, Inc., Troy, Mich.

[21] Appl. No.: 648,466

[22] Filed: Sep. 7, 1984

[51] Int. Cl.$^4$ .......................... C22C 9/02; F16C 33/12
[52] U.S. Cl. .............................. 428/677; 308/DIG. 8;
420/470; 420/474
[58] Field of Search ............... 420/499, 470, 472, 473,
420/474, 475; 148/412, 433; 428/677;
308/DIG. 8

[56] References Cited

U.S. PATENT DOCUMENTS 2,975,255  3/1961  Lafferty ............................... 420/499

FOREIGN PATENT DOCUMENTS 45-27216   9/1970  Japan ................................. 420/499
56-142839 11/1981  Japan ................................. 420/470
57-73147   5/1982  Japan ................................. 148/433

Primary Examiner—Peter K. Skiff
Attorney, Agent, or Firm—Barnes, Kisselle, Raisch, Choate, Whittemore & Hulbert

[57] ABSTRACT

A bearing material comprising copper and bismuth. Preferably there is from 12% to 18% by weight of bismuth and for some purposes there may be up to 35%. Depending upon special requirements, the bearing material may also have varying amounts of silver, antimony, zinc, phosphorous and nickel. Copper usually constitutes at least 50% by weight of the material.

4 Claims, 1 Drawing Figure

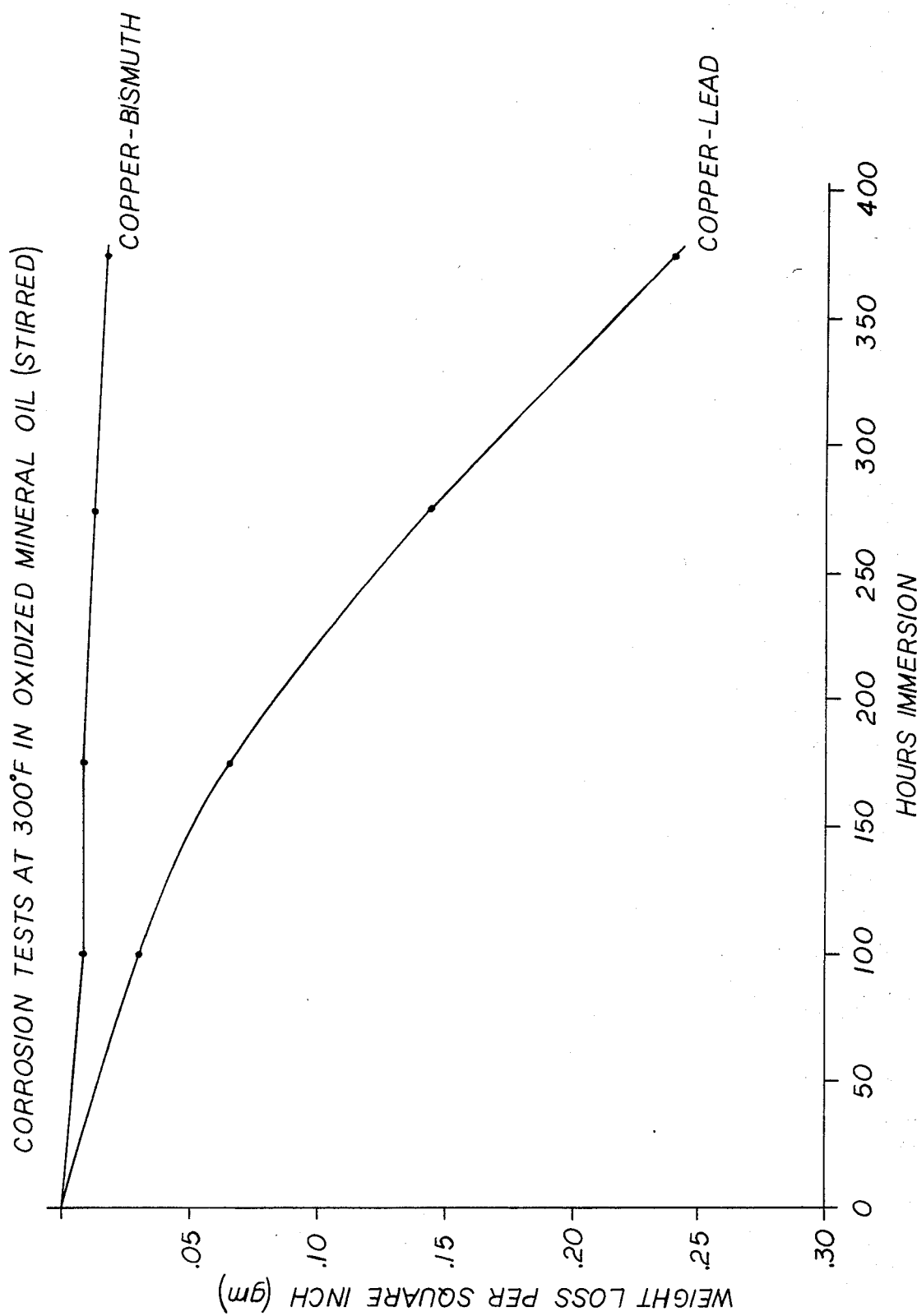

BEARING MATERIALS

This invention relates to a copper base alloy for use as a bearing material, for example in thin shell bearings where the alloy requires to be bonded, by sintering, casting or rolling for example, to a steel back.

BACKGROUND AND SUMMARY OF THE INVENTION

According to the present invention, the bearing alloy comprises copper and bismuth. Preferably there is from 12% to 18% by weight of bismuth and for some purposes there may be up to 35% by weight of bismuth. The copper may or may not constitute the balance but will usually constitute at least 50% by weight of the material.

It has been discovered that such copper-bismuth alloys possess many superior properties to those currently in use as engine bearing materials.

Engine bearing alloys in use currently and hitherto have consisted of either an aluminum or copper matrix containing, among other additions, a major alloying addition of a low melting point phase. This low melting point phase is usually an elemental metal which is not soluble in the matrix and exists therefore as a discrete phase. In aluminum matrix alloys the well known and well used low melting point phases are tin, lead and cadmium and many alloys are currently in use containing these constituents.

In the case of copper based alloys, however, only one type of alloy, I believe, has hitherto been known and that is the copper-lead range of alloys. Lead is one of the few low melting point metals which has the properties necessary to form a good bearing material with copper. The copper-lead alloys containing typically anything from 10% to 30% lead have given good service as engine bearing alloys for 60 years but they have some limitations which do not apply to the copper-bismuth alloys.

The two most serious problems with copper-lead alloys are:

(1) that lead is a toxic substance and the use of lead in the production of alloys is surrounded by legislation and expensive control procedures; and (2) the lead phase in copper-lead alloys is seriously affected by corrosive attack in hot engine oil. When engine oil is oxidized while hot (during the normal running of an engine) the oil breaks down to form peroxides and organic acids which dissolve the lead phase; this seriously weakens the bearing alloys and causes eventual malfunction and failure.

It has been found that copper-bismuth alloys are many times more resistant to this type of attack.

Tests on a laboratory test rig which simulates a bearing environment have shown that the surface properties of copper-bismuth are superior to copper-lead alloys with the same volume percentage of second phase material. The test consists of pressing a sample of bearing material against a rotating shaft under conditions of sparse lubrication. The load is gradually increased until the bearing material "picks up" or seizes on the shaft. Tests on copper-14% by weight of lead and copper-12% by weight of bismuth have shown that the failure load for copper-lead was 60 pounds against an 80 pound failure load for copper-bismuth.

The other bearing properties of the copper-bismuth alloys have been found to be similar to those of the copper-lead alloys currently in use and the processes required for the manufacture of copper-bismuth alloys are basically the same as for copper-lead.

Although the basic alloys of this invention are all based on copper and bismuth, other additions can be made which are either to ease production or to modify the alloy properties. Tin or silicon, for example, can be added to strengthen and harden the matrix and lead, and antimony or zinc can be added to modify the bismuth phase and the behavior of the pre-alloyed mixture during processing.

One other unique feature of bismuth is that it is the only metal which expands on solidifying. This means that on solidification, where another soft phase (such as lead in copper) would shrink away from the surrounding matrix with the consequential risk of shrinkage void formation, bismuth expands by 3.5% and puts compressive stress in the surrounding matrix. This is believed to be the reason for the higher strength exhibited by the copper-bismuth alloy when compared with a copper-lead alloy containing an equivalent volume of soft phase.

These and other objects of the invention will become more apparent as the following description proceeds, especially when considered with the accompanying drawing.

BRIEF DESCRIPTION OF THE DRAWING

The single FIGURE is a graph showing the resistance to the corrosive effects of the acid in oxidized engine oil on a copper-bismuth alloy as compared to a copper-lead alloy.

DETAILED DESCRIPTION

Copper-bismuth formulations within the following range provide bearing materials capable of acceptable performance.

5%-35% by weight of bismuth
0%-10% by weight of tin
balance copper

A preferred range would be:
10%-20% by weight of bismuth
0.5%-4% by weight of tin
0%-1% by weight of lead
balance copper It is believed that the best results are obtainable from formulations within the following range:
12% to 18% by weight of bismuth
1% to 3% by weight of tin
0.5% by weight of lead
balance copper Depending upon special requirements for particular applications, additions of any one or more of the following elements in the indicated amounts may be made to the above formulations:
0% to 2% by weight of silver
0% to 1% by weight of antimony
0% to 4% by weight of zinc
0% to 0.1% by weight of phosphorous
0% to 15% by weight of nickel Specific examples of alloys embodying the invention are as follows:

|  | Bismuth | Tin | Lead | Copper |
|---|---|---|---|---|
| Example I | 12% | 1% | 0% | 87% |
| Example II | 16% | 0% | 0% | 84% |
| Example III | 16% | 1% | 1% | 82% |

-continued

|  | Bismuth | Tin | Lead | Copper |
|---|---|---|---|---|
| Example IV | 16% | 2% | 1% | 81% |
| Example V | 16% | 2% | 2% | 80% |
| Example VI | 16% | 4% | 1% | 79% |
| Example VII | 18% | 2% | 0% | 80% |
| Example VIII | 20% | 2% | 0% | 78% |

Examples I–VIII were made by spreading powder of the appropriate composition onto steel strip, sintering in a protective atmosphere, rolling to 100% density and then re-sintering under appropriate conditions.

Referring to the drawing, there is a graph illustrating the resistance of a copper-bismuth alloy and a copper-lead alloy to the corrosive effects of the acid (tartaric acid) in engine oil. The copper-bismuth alloy consisted of 19.5% by weight of bismuth, 1.25% by weight of tin and the balance copper. The copper-lead alloy consisted of 23% by weight of lead, 1.25% by weight of tin and the balance copper. The volume of bismuth in the copper bismuth alloy was substantially the same as the volume of lead in the copper-lead alloy. The weight loss due to the corrosive effects of the acid was found to be substantially greater for the copper-lead alloy than for the copper-bismuth alloy.

I claim:

1. A bearing comprising bearing material bonded to a steel backing, said bearing material consisting essentially of 10% to 20% by weight of bismuth, 0.5% to 4% by weight of tin, 0% to 1% by weight of lead and the balance copper.

2. A bearing as defined in claim 1, including any one or more of the following ingredients in the amounts indicated:
0% to 2% by weight of silver
0% to 1% by weight of antimony
0% to 4% by weight of zinc
0% to 0.1% by weight of phosphorous
0% to 15% by weight of nickel.

3. A bearing comprising bearing material bonded to a steel backing, said bearing material consisting essentially of between 12% to 18% by weight of bismuth, 1% to 3% by weight of tin, 0.5% by weight of lead and the balance copper.

4. A bearing as defined in claim 3, including any one or more of the following ingredients in the amounts indicated:
0% to 2% by weight of silver
0% to 1% by weight of antimony
0% to 4% by weight of zinc
0% to 0.1% by weight of phosphorous
0% to 15% by weight of nickel.

* * * * *